US010069437B2

(12) United States Patent
Kim

(10) Patent No.: US 10,069,437 B2
(45) Date of Patent: Sep. 4, 2018

(54) OIL TYPE PHASE SHIFT TRANSFORMER FOR MEDIUM VOLTAGE INVERTER SYSTEM

(71) Applicant: LSIS CO., LTD., Gyeonggi-do (KR)

(72) Inventor: Tae-Bum Kim, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/388,357

(22) Filed: Dec. 22, 2016

(65) Prior Publication Data
US 2017/0288572 A1 Oct. 5, 2017

(30) Foreign Application Priority Data

Apr. 5, 2016 (KR) .................. 10-2016-0041626

(51) Int. Cl.
H01F 27/29 (2006.01)
H02M 7/44 (2006.01)
H01F 27/04 (2006.01)
H01F 27/12 (2006.01)
H01F 29/02 (2006.01)
H01H 9/00 (2006.01)

(52) U.S. Cl.
CPC .............. *H02M 7/44* (2013.01); *H01F 27/04* (2013.01); *H01F 27/12* (2013.01); *H01F 27/29* (2013.01); *H01F 29/02* (2013.01); *H01H 9/0044* (2013.01); *H01H 2009/005* (2013.01)

(58) Field of Classification Search
CPC .......................................... H01F 27/00–27/36
USPC ..................................... 336/55–62
See application file for complete search history.

(56) References Cited

U.S. PATENT DOCUMENTS 2,360,801 A * 10/1944 Fenwick ................. H01F 27/40
174/167
2,600,979 A * 6/1952 Dormont ................. H01F 27/04
174/12 R
3,028,568 A * 4/1962 Camilli .................... H01F 38/26
174/143
3,333,221 A * 7/1967 Lockie ................. H01F 27/402
252/62.51 R (Continued)

FOREIGN PATENT DOCUMENTS

CN 201616328 10/2010
CN 203013471 U 6/2013

(Continued)

OTHER PUBLICATIONS

Search Report dated Jul. 4, 2017 issued in corresponding European Application No. 16201174.6.

(Continued)

*Primary Examiner* — Tuyen Nguyen
(74) *Attorney, Agent, or Firm* — K&L Gates LLP

(57) ABSTRACT

Disclosed is a phase shift transformer for supplying voltage to a plurality of unit power cells in a medium voltage inverter system. The phase shift transformer according to the present invention comprises a first bushing arranged by the side of a tank and connected to a first winding to apply high voltage and a plurality of second bushings arranged on the top of a cover and connected to each of a plurality of second windings to output low voltage, wherein three outputs of the plurality of second bushings can be applied to unit power cells.

2 Claims, 9 Drawing Sheets

(56) References Cited

U.S. PATENT DOCUMENTS

| | | | | | |
|---|---|---|---|---|---|
| 3,541,487 | A | * | 11/1970 | Leonard | H01F 27/125 165/104.14 |
| 3,564,386 | A | * | 2/1971 | Leonard | H02M 7/10 174/139 |
| 5,804,954 | A | * | 9/1998 | Laplace, Jr. | G05F 1/147 323/256 |
| 2012/0043922 | A1 | | 2/2012 | Jackson et al. | |

FOREIGN PATENT DOCUMENTS

| | | | | |
|---|---|---|---|---|
| CN | 203242482 U | | 10/2013 | |
| CN | 205016009 U | | 2/2016 | |
| EP | 0957496 A2 | * | 11/1999 | H01F 27/02 |
| JP | S4911868 A | | 2/1974 | |
| JP | S4982927 A | | 8/1974 | |
| JP | H06112052 A | | 4/1994 | |
| JP | 07297039 A | * | 11/1995 | |
| JP | H0817661 A | | 1/1996 | |
| JP | 2003243227 A | | 8/2003 | |
| JP | 2014523227 A | | 9/2014 | |
| JP | 2015201560 A | | 11/2015 | |
| KR | 100802627 B1 | | 2/2008 | |
| KR | 20080067320 A | | 7/2008 | |
| KR | 100995709 B1 | | 11/2010 | |

OTHER PUBLICATIONS

WEG: "Motors Automation Energy Transmission & Distribution Coatings MVW01 Medium Voltage Variable Speed Drive", Jul. 1, 2015.

Winders, "Two-Winding Transformer Connections", In: "Power Transformers: Principles and Applications", Apr. 12, 2002, CRC Press.

Japanese Office Action for related Japanese Application No. 2016-234569; action dated Feb. 6, 2018; (4 pages).

Chinese Office Action for related Chinese Application No. 201611155295.5; action dated May 25, 2018; (6 pages).

\* cited by examiner (PRIOR ART)

OIL TYPE PHASE SHIFT TRANSFORMER FOR MEDIUM VOLTAGE INVERTER SYSTEM

CROSS REFERENCE TO RELATED APPLICATION

This application claims the benefit of Korean Patent Application No. 10-2016-0041626, filed on Apr. 5, 2016, entitled "OIL TYPE PHASE SHIFT TRANSFORMER FOR MEDIUM VOLTAGE INVERTER SYSTEM", which is hereby incorporated by reference in its entirety into this application.

BACKGROUND

1. Technical Field

The present invention relates to an oil type phase shift transformer for a medium voltage inverter system.

2. Description of the Related Art

In general, a voltage type medium voltage inverter is an inverter whose root mean square value of input line-to-line voltage is 600V or more, which is used to drive an electric motor having large capacity of several hundreds of kW to several tens of MW. Such medium voltage inverter is typically configured as a cascaded H-bridge type.

This medium voltage inverter requires a phase shift transformer in order to provide galvanic isolation and harmonics mitigation to an input terminal and supply input power to each of unit power cells. This phase shift transformer is a very important factor in design of the medium voltage inverter because it occupies the majority of volume and weight of the medium voltage inverter.

Such phase shift transformer is divided into an oil type transformer and a dry type transformer depending on use of insulating oil. In a conventional medium voltage inverter system, the dry type transformer has been used.

In the case of the dry type transformer, an identification code for protection is IP20, which is not suitable to be installed outdoors. The first digit in the IP rating indicates a vibration proof level and the second digit indicates a water proof level. In the case of the dry type transformer, it is almost impossible to protect the transformer from dust, in particular water.

Therefore, in the conventional medium voltage inverter system, the dry type phase shift transformer must be installed indoors in the same way as the unit power cell.

FIG. 1 is a configuration diagram of a conventional medium voltage inverter system.

As can be seen from this figure, the phase shift transformer 200 is contained in a separate panel and disposed by the side of a panel containing power cells 100. In addition, a forced cooling fan for maintaining temperature of the transformer is required to be installed on the top of the panel.

In the conventional phase shift transformer, there are problems that it is difficult to secure space because the transformer must be an indoor type and that the transformer is significantly affected by surroundings due to characteristics of the forced cooling type thereof.

SUMMARY

It is an aspect of the present invention to provide a phase shift transformer for a medium voltage inverter system, which is configured as an oil type phase shift transformer so that spatial degrees of freedom are secured and high voltage devices and low voltage devices are managed separately.

The present invention is not limited to the above aspect and other aspects of the present invention will be clearly understood by those skilled in the art from the following description.

In accordance with one aspect of the present invention for accomplishing the object as mentioned above, a phase shift transformer for supplying voltage to a plurality of unit power cells in a medium voltage inverter system comprises: a first winding which is configured to surround the outside of a core and to which three phase high voltage is applied; a plurality of second windings which are configured to surround the outside of the core and convert high voltage applied thereto from the first winding to low voltage; a tank providing an internal space in which the core, the first winding and the plurality of second windings are arranged and containing insulating oil therein; a cover provided on the top of the tank to provide a sealed internal space along with the tank; a first bushing arranged by the side of the tank and connected to the first winding to apply high voltage; and a plurality of second bushings arranged on the top of the cover and connected to each of the plurality of second windings to output low voltage, wherein three outputs of the plurality of second bushings can be applied to the unit power cells.

In a preferred embodiment of the present invention, the phase shift transformer may further comprise radiators arranged on the front and back surfaces of the tank to cool the insulating oil or the first winding and the second windings.

In a preferred embodiment of the present invention, the phase shift transformer may further comprise a tap changer arranged on the top of the cover to control voltage variation during operation of the phase shift transformer.

In a preferred embodiment of the present invention, the phase shift transformer may further comprise a housing in which the plurality of low voltage bushings are arranged, wherein the housing can be provided such that a top cover is capable of being opened and closed.

According to the present invention as described above, the transformer can be installed outdoors and hence it is possible to minimize indoor area for installing the transformer by installing only the unit power cells indoors. Therefore, there are advantageous effects that spatial degrees of freedom in the design of the medium voltage inverter system are increased and that it is possible to manage separately high voltage devices and low voltage devices.

DETAILED DESCRIPTION

Figure 1:
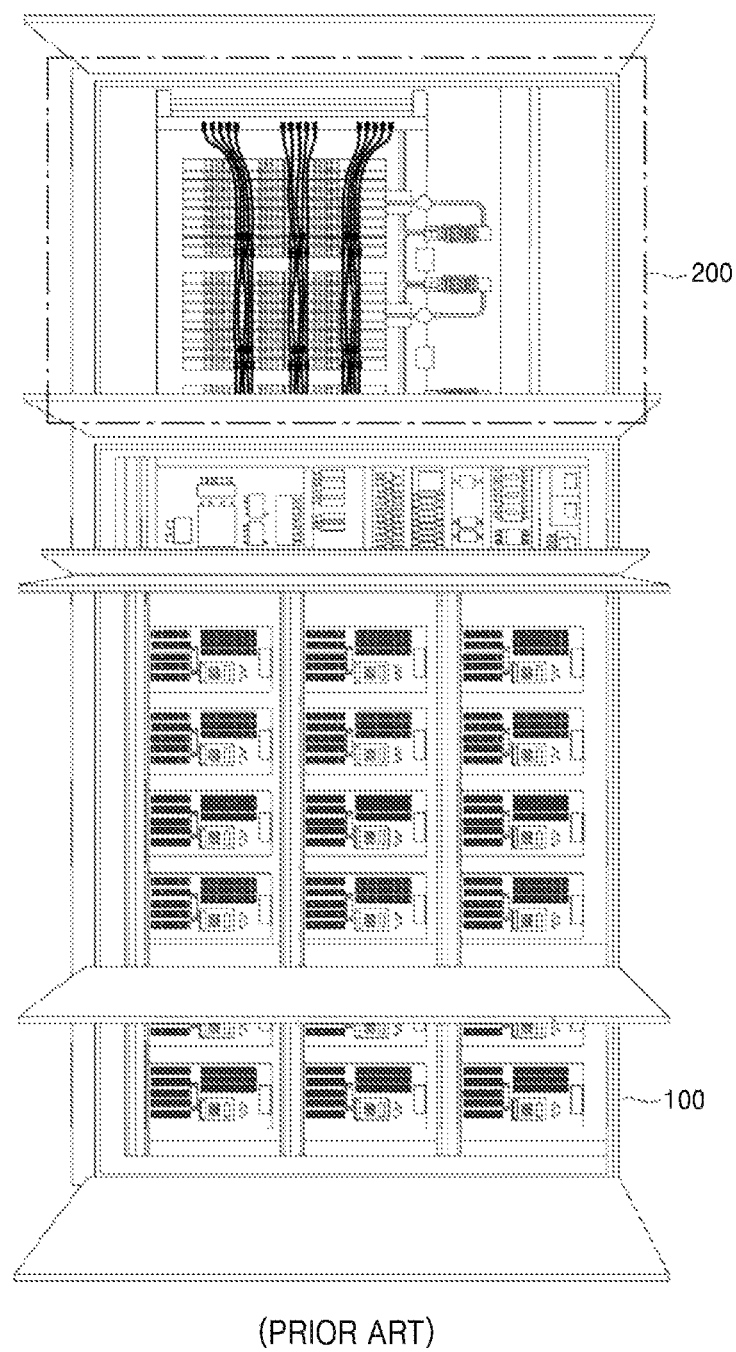
FIG. 1 is a configuration diagram of a conventional medium voltage inverter system.

As the present invention may have different embodiments and various modifications thereto, specific embodiments are illustrated in the drawings and described in detail in the following description. This, however, is by no means to restrict the present invention to the specific embodiments, it is to be understood to include all changes, equivalents, and substitutes falling within the spirit and scope of the present invention.

Preferred embodiments of the present invention will now be described in detail with reference to the accompanying drawings. In this process, sizes or shapes of constituent elements shown in the drawings may be exaggerated for clarity and convenience in explanation.

Figure 2:
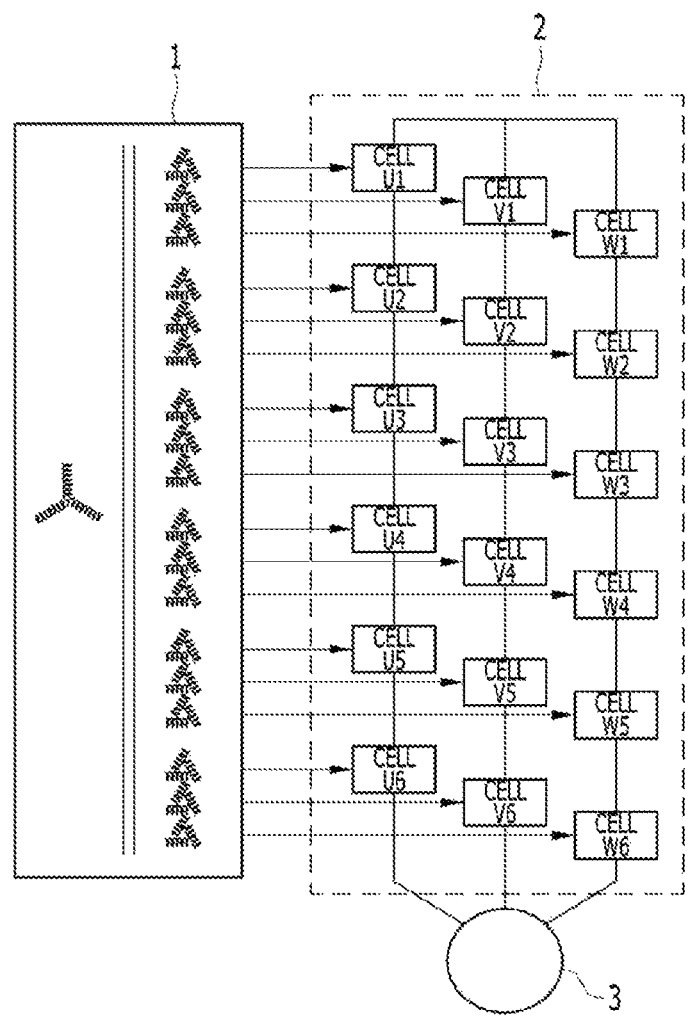
FIG. 2 is a configuration diagram illustrating schematically a medium voltage inverter system to which the present invention is applied.

FIG. 2 is a configuration diagram illustrating schematically a multi-level medium voltage inverter system to which the present invention is applied.

As shown in the figure, the medium voltage inverter system to which the present invention is applied comprises an oil type phase shift transformer 1 and a plurality of unit power cells 2 according to an embodiment of the present invention. The resulting voltage output from the plurality of unit power cells 2 can be output to a three phase electric motor 3.

The phase shift transformer 1, of which primary side input is about 3 to 11 kV and secondary side output is about 635V, may be composed of a plurality of coils.

A plurality of unit power cells 2 may stack secondary side voltages to make up a variable output to apply to an electric motor.

Figure 3:
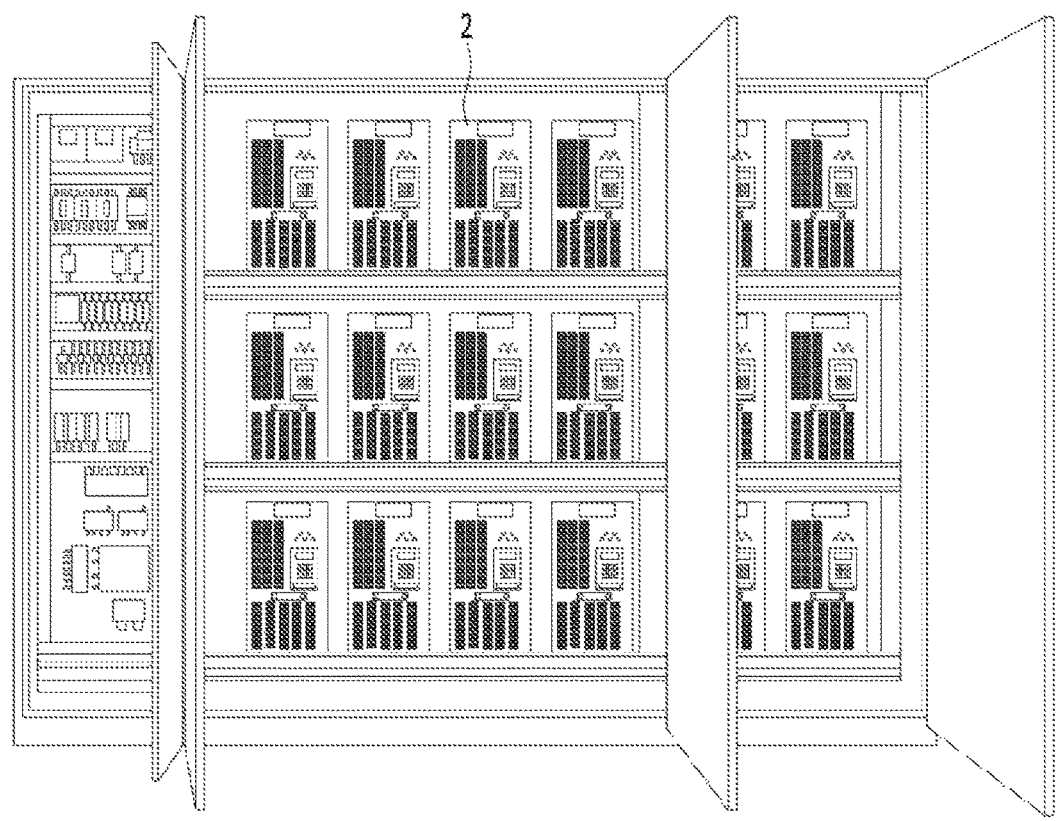
FIG. 3 is an exemplary representation illustrating the medium voltage inverter system which is implemented indoors in accordance with the present invention.

FIG. 3 is an exemplary representation illustrating the medium voltage inverter system which is implemented indoors in accordance with the present invention.

As shown in the figure, as the phase shift transformer 1 is configured as an oil type phase shift transformer, there is no need for the phase shift transformer to be installed indoors and thus, it is possible to place only a panel containing the plurality of unit power cells 2 indoors. Therefore, it can be seen that spatial degrees of freedom are increased because of no requirement for the space where the phase shift transformer 1 has been placed.

Figure 4:
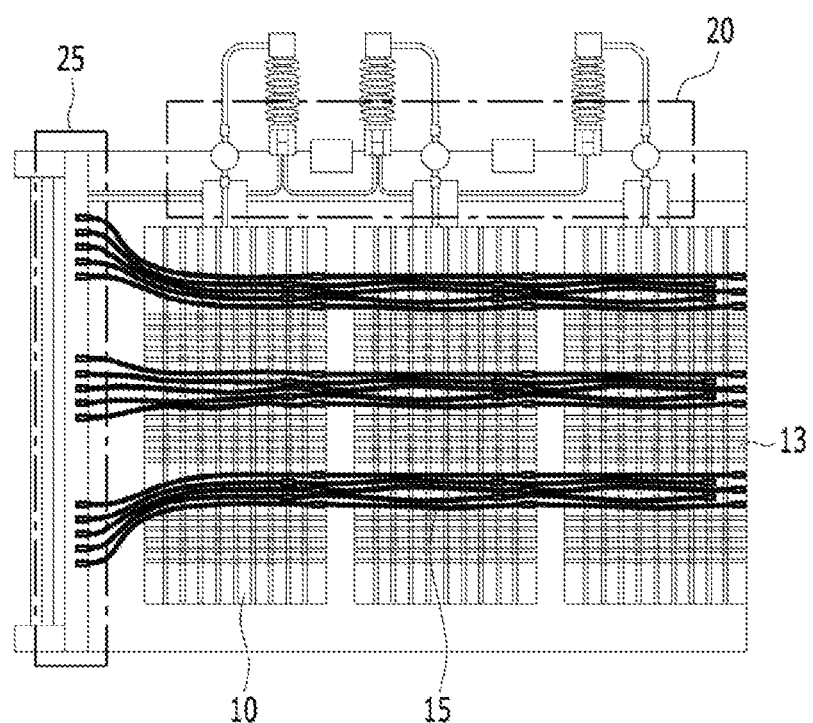
FIG. 4 is an exemplary representation illustrating windings and a core which are implemented in the interior of an oil type transformer according to the present invention.

FIG. 4 is an exemplary representation illustrating windings and a core which are implemented in the interior of an oil type transformer according to the present invention.

As shown in the figure, windings 13 and 15 are configured to surround the outside of a core 10, wherein the windings include a primary winding 13 (hereinafter, referred to as "first winding") and a secondary winding 15 (hereinafter, referred to as "second winding"). Structure of the second winding 15 may be determined depending on the number of unit power cells 2.

Three phase voltage of about 3 to 11 kV may be applied to three high voltage bushings 20, and then voltage of 635V may be output to a plurality of low voltage bushings 25 through the second winding 15 via the first winding 13. In this case, the "high voltage bushing" means a connection element for applying high voltage power to be supplied from the outside to the windings, which is also referred to as a "primary bushing." In addition, the "low voltage bushing" means a connection element for drawing out the transformed low voltage power to the outside, which is also referred to as a "secondary bushing."

The core 10 may be formed in a shell type and windings 13, 15 may be configured such that they have high conductivity and the outsides thereof are electrically insulated.

These windings and core may be contained in a tank filled with insulating oil, as described later.

Hereinafter, external constitution of the oil type transformer will be described with reference to the drawings.

Figure 5:
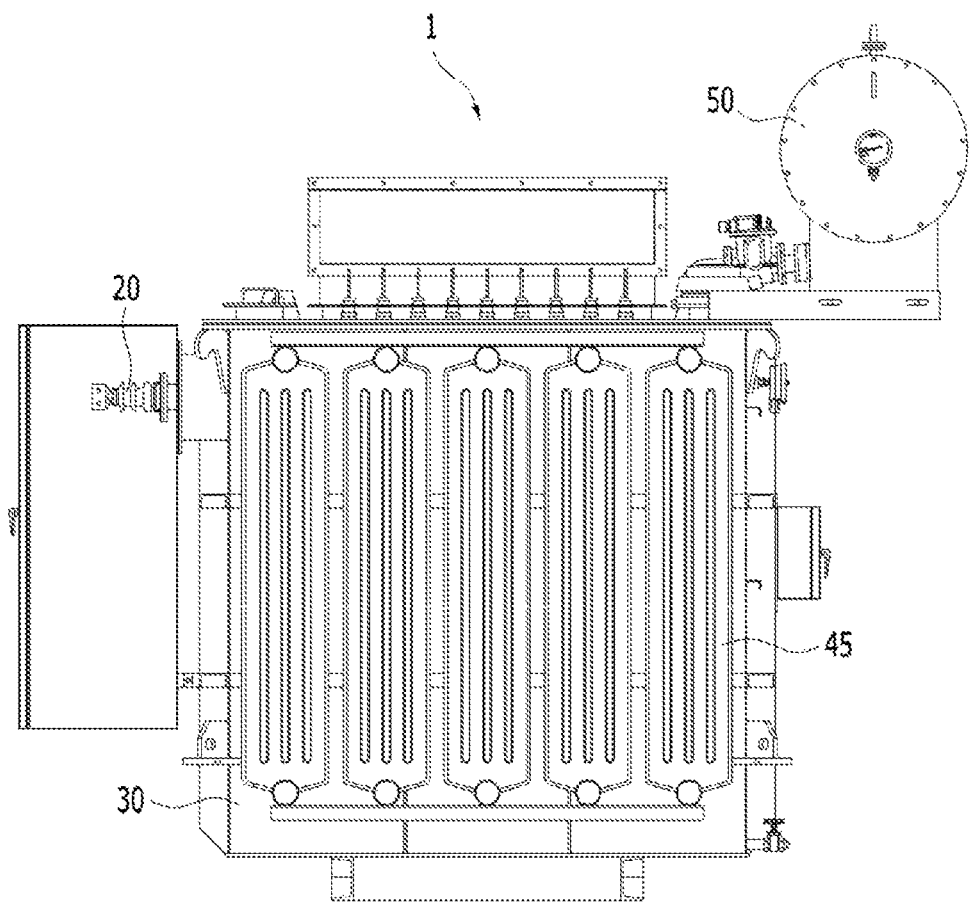
FIG. 5 is an exemplary representation illustrating the appearance of an oil type transformer according to an embodiment of the present invention when viewed from the front.
Figure 6:
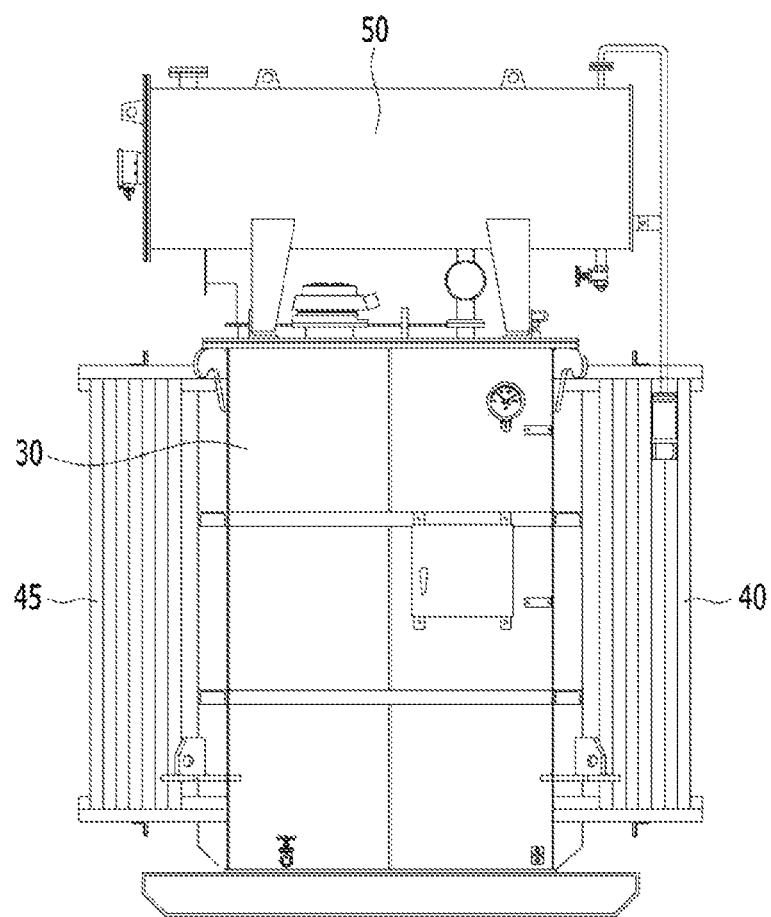
FIG. 6 is an exemplary representation illustrating the appearance of the oil type transformer according to an embodiment of the present invention when viewed from the side.
Figure 7:
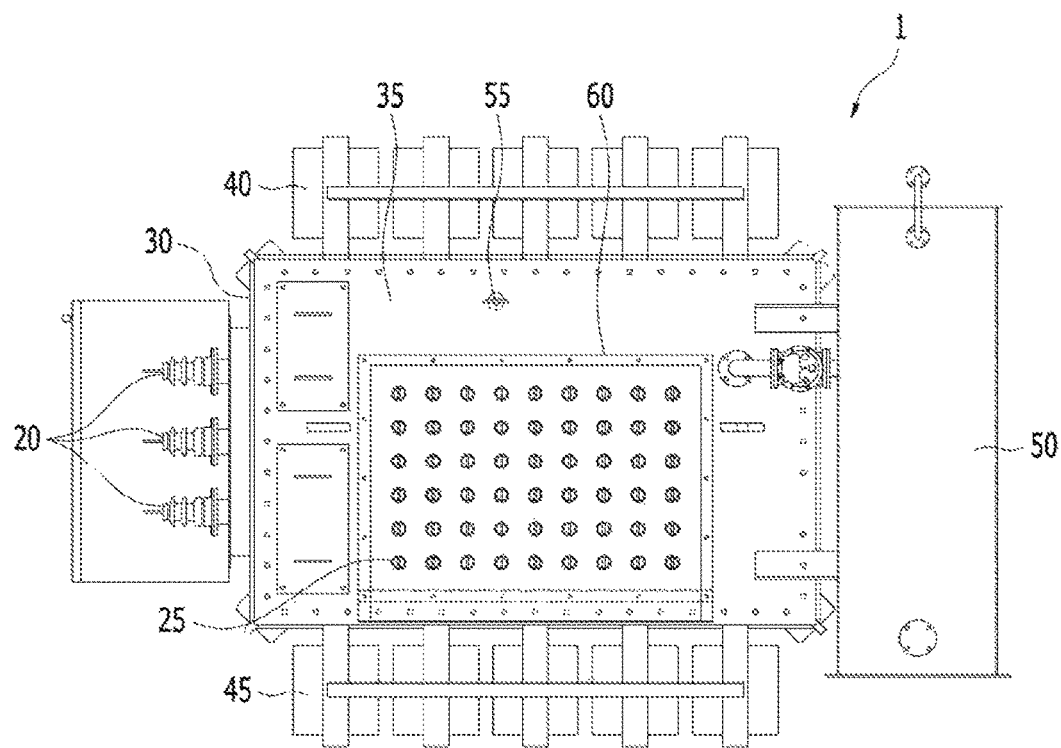
FIG. 7 is an exemplary representation illustrating the appearance of the oil type transformer according to an embodiment of the present invention when viewed from the top.
Figure 8:
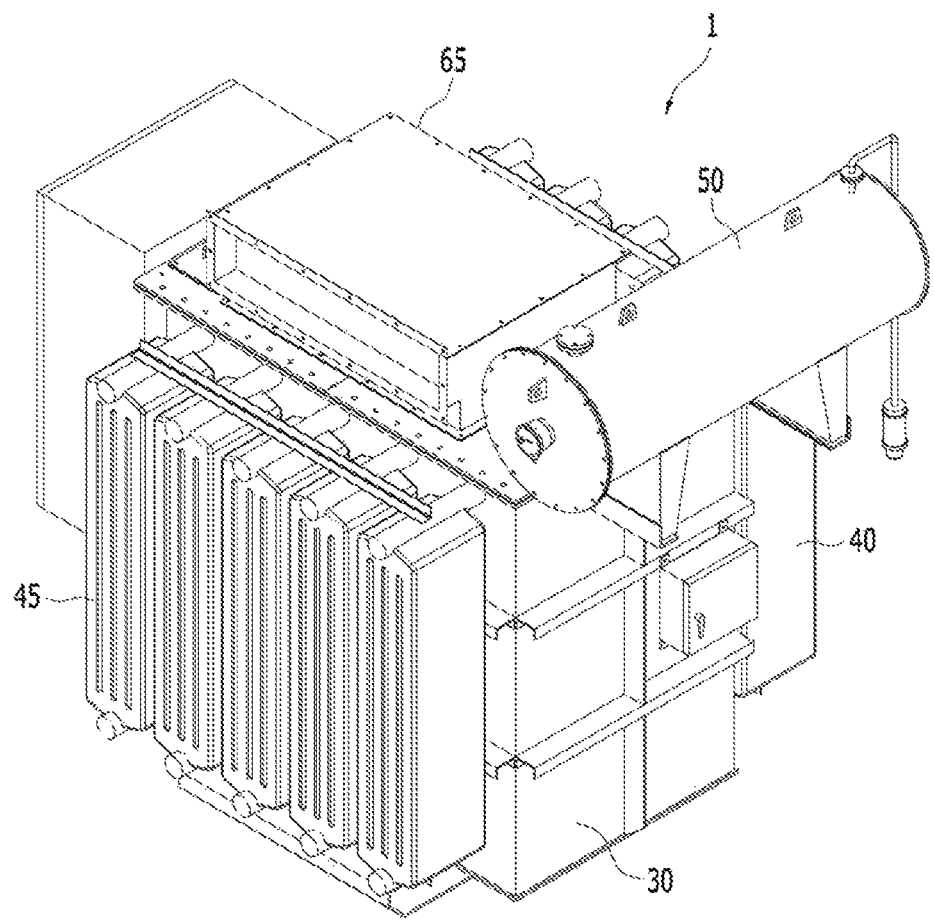
FIG. 8 is a perspective view of an example of the appearance of the oil type transformer according to an embodiment of the present invention.
Figure 9:
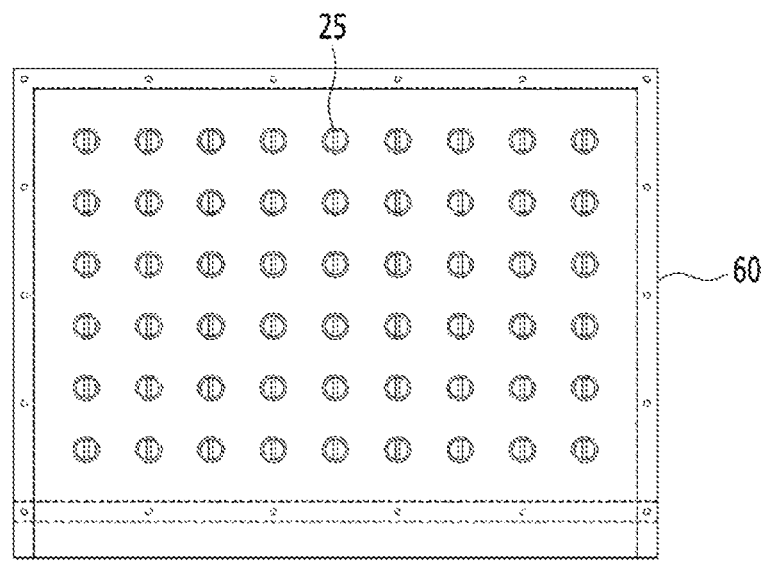
FIG. 9 is an exemplary representation illustrating a plurality of low voltage bushings when viewed from the top.
Figure 10:
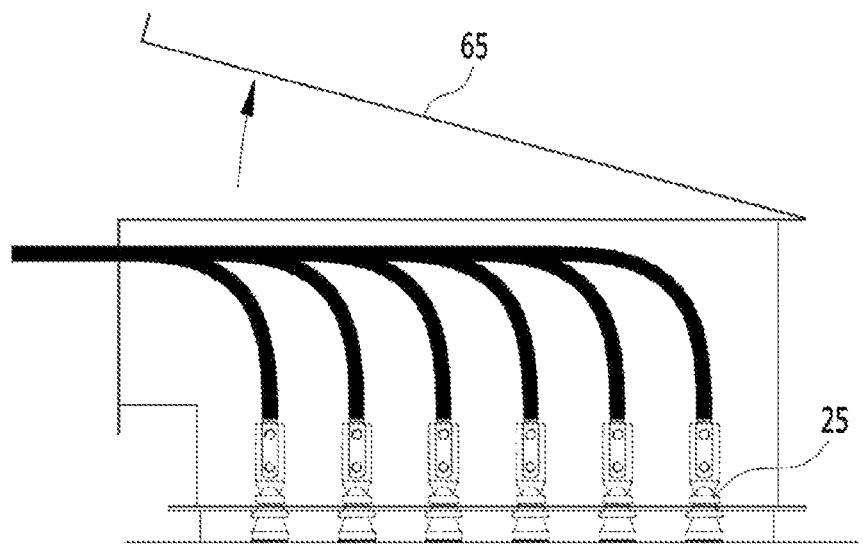
FIG. 10 is an exemplary representation illustrating operation of a top cover of the plurality of low voltage bushings.

FIG. 5 is an exemplary representation illustrating the appearance of the oil type transformer according to an embodiment of the present invention when viewed from the front, FIG. 6 is an exemplary representation illustrating the appearance of an oil type transformer according to an embodiment of the present invention when viewed from the side, and FIG. 7 is an exemplary representation illustrating the appearance of an oil type transformer according to an embodiment of the present invention when viewed from the top. FIG. 8 is a perspective view of an example of the appearance of an oil type transformer according to an embodiment of the present invention. Furthermore, FIG. 9 is an exemplary representation illustrating a plurality of low voltage bushings when viewed from the top and FIG. 10 is an exemplary representation illustrating operation of a top cover of the plurality of low voltage bushings.

As shown in the figures, the oil type phase shift transformer 1 according to an embodiment of the present invention comprises a tank 30 for providing an internal space in which the core 10 and the windings 13, 15 are arranged and also comprises a cover 35 provided on the top of the tank 30. The tank 30 and the cover 35 may provide a sealed internal space.

The first winding 13 and the second winding 15 are arranged inside the tank 30 filled with the insulating oil.

A high voltage bushing 20 which is connected to the first high voltage winding 13 may be disposed by the side of the tank 30 while a plurality of low voltage bushings 25 which are connected to the second low voltage winding 15 may be disposed on the cover 35. The plurality of low voltage bushings 25 are to supply three phase voltage to the plurality of unit power cells 2 wherein three low voltage bushings 25 may be connected to a single power cell 2.

In this embodiment of the present invention, 54 low pressure bushings 25 are shown as having been designed, but it is apparent that the present invention is not limited to those number. That is, various number of the low voltage bushings 25 may be provided depending on output of the inverter.

The tank 30 may have a structure such as a welded steel vessel. By virtue of such structure, the transformer 1 can be lifted or moved without any leakage of insulating oil. Further, the cover 35 may be fastened to the tank 30 in a manner of gasket sealing by means of bolts. The gasket may be made as a type that can withstand hot oil.

The front and back surfaces of the tank 30 are provided with radiators 40, 45 for cooling. The radiators 40, 45 may be operated such that temperature of the windings 13, 15 or insulating oil does not exceed a certain limit.

One side of the cover 35 may be provided with an oil conservator 50. The oil conservator is to prevent the oil in the oil type transformer 1 from being exposed to the air because the oil can be deteriorated when it contacts with the air. In other words, a cylindrical vessel of a small volume, which is referred to as a conservator 50, is disposed on the top of the tank 30 and connected to the tank 30 such that no air exists in the tank 30. Accordingly, the surface area where the insulating oil contacts with the air becomes small and the air does not directly flow in and out of the tank 30 during respiration of the tank so that deterioration of the insulating oil is prevented.

A tap changer 55 may be arranged on the top of the cover 35. In an embodiment of the invention, the tap changer 55 may be a no load tap changer (NLTC), but the present invention is not limited thereto. Voltage of the transformer 1 can be reset externally through the tap changer 55. That is, a tap of the tap changer 55 can be adjusted during operation of the transformer 1, thereby adjusting voltage of the transformer 1.

Referring to FIGS. 9 and 10, the plurality of low voltage bushings 25 arranged on the top of the cover 35 are shown. The plurality of low voltage bushings 25 may be arranged within the housing 60 and an upper cover 65 of the housing 60 may be provided to be opened and closed. By virtue of such configuration, it is possible to change power cells 2 which are connected to the low voltage bushings 25.

Three low voltage bushings 25 may be connected to a single power cell 2 because voltage input to the single power cell 2 is three phase voltage.

As the oil type phase shift transformer 1 for the inverter system, according to the present invention, becomes a structure corresponding to IP 54 rating, it can be installed in various places such as indoors or outdoors.

Therefore, as the transformer 1 can be installed outdoors, it is possible to install only the power cells 2 indoors so that the spatial degrees of freedom are increased and it is also possible to manage separately high voltage devices and low voltage devices.

In the foregoing description, preferred embodiments according to the present invention are described, but they are merely exemplary examples of the invention. It is to be understood by those having ordinary skill in the art that various modifications and other embodiment equivalent to the invention can be made from the details discussed above. Therefore, the true scope of the present invention should be defined by the appended claims.

What is claimed is:

1. A phase shift transformer for supplying voltage to a plurality of unit power cells in a medium voltage inverter system, comprising:
   a first winding configured to surround an outside of a core and to which a three-phase high voltage is applied;
   a plurality of second windings configured to surround the outside of the core and to convert the three-phase high voltage applied thereto from the first winding to a low voltage;
   a tank providing an internal space in which the core, the first winding, and the plurality of second windings are arranged, and the tank containing an insulating oil therein;
   a cover provided on the top of the tank to provide a sealed internal space along with the tank;
   a first bushing arranged by the side of the tank and connected to the first winding to apply the three-phase high voltage;
   a plurality of second bushings arranged on the top of the cover and connected to each of the plurality of second windings to output the low voltage,
   radiators arranged on front and back surfaces of the tank to cool the insulating oil or the first winding and the second windings;
   an oil conservator disposed on the top of the tank and connected to the tank; and
   a housing in which the plurality of second bushings are arranged, wherein a cover thereof is capable of being opened and closed,
   wherein the plurality of second bushings supply the three-phase high voltage to the plurality of unit power cells, and
   wherein three outputs of the plurality of second bushings are connected to the unit power cells.

2. The phase shift transformer of claim 1, further comprising a tap changer arranged on the top of the cover to control voltage variation during operation of the phase shift transformer.

* * * * *